Sept. 7, 1926. Re. 16,419
J. R. L. SANTOS
HANDLE LOCK FOR PNEUMATIC TOOLS.
Original Filed June 4, 1920
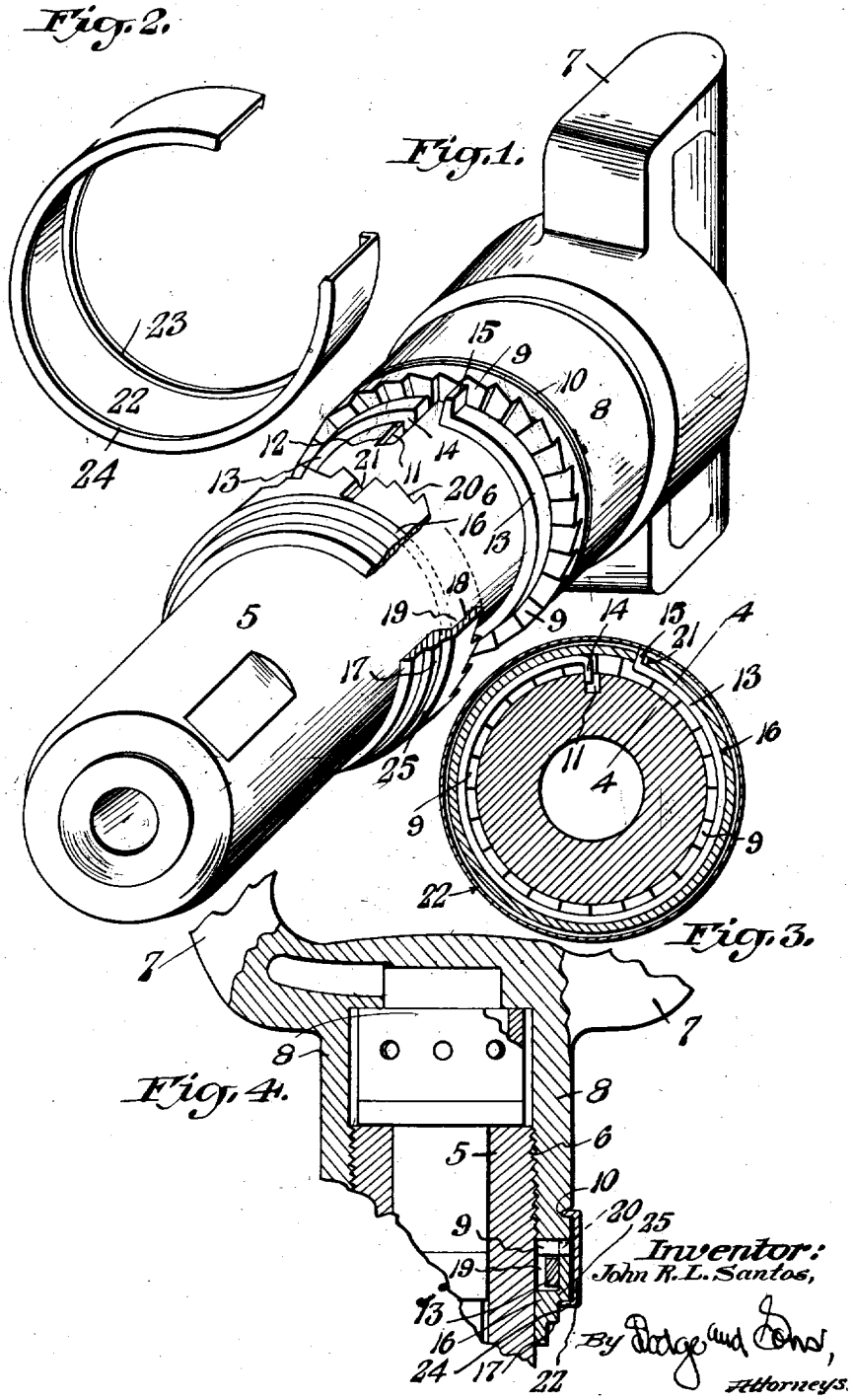

Reissued Sept. 7, 1926. Re. 16,419

UNITED STATES PATENT OFFICE.

JOHN W. L. SANTOS, OF BALTIMORE, MARYLAND, ASSIGNOR TO GEORGE OLDHAM & SON COMPANY, OF BALTIMORE, MARYLAND, A CORPORATION OF PENNSYLVANIA.

HANDLE LOCK FOR PNEUMATIC TOOLS.

Original No. 1,595,739, dated April 23, 1925, Serial No. 356,516, filed June 4, 1920. Application for reissue filed July 7, 1925. Serial No. 42,102.

This invention relates to improvements in pneumatic tools and has particular reference to an improved locking device to lock the handle on the barrel of the tool and prevent the two from becoming unscrewed because of the jar to which the tool is subjected in operation.

The object of the invention is not only to provide improved means for preventing the handle from jarring loose on the barrel, but to provide an improved means that constantly tends to rotate on the barrel, while engaging the handle, and apply a force in a direction that would cause the barrel and handle to become more securely engaged by rotating the parts in a direction to tighten instead of loosen them.

The invention is illustrated in the accompanying drawing, wherein:

Figure 1 shows a tool in perspective, the improved locking devices being separated for the purpose of illustration and the rotatable coupling-ring being broken away to show its cross-sectional shape, with the spring retaining clip removed;

Fig. 2 illustrates the detached spring-clip in perspective;

Fig. 3 shows a cross-sectional detail through the barrel and the improved locking device engaging the same with the handle; and Fig. 4 illustrates a fragmentary sectional detail through a portion of the handle, the barrel and the improved locking device, as the same would appear if viewed on the line 4—4 of Fig. 3.

In the drawing the numeral 5 designates the barrel or cylinder of the tool, while the handle having a cylinder head formed integral therewith is designated 7. This member has a circular cylinder head portion 8 whose lower edge is provided with a circular series of ratchet teeth 9 which face downwardly and are radially disposed around the barrel. The circular portion 8 of the handle is provided with the usual internally threaded socket into which the threaded portion 6, Fig. 4, of the barrel screws.

An annular channel or groove 10 is provided around the circular portion 8 of the handle for a purpose that will presently be explained.

The barrel is provided with a recess 11 forming a locking wall or abutment 12 that extends longitudinally of the barrel. This recess is positioned in the barrel adjacent the radial ratchet teeth 9.

A split spring ring 13 encircles the barrel and this ring has an inturned hook 14 at one end, and an out-turned hook 15 at the opposite end thereof. The tendency of this spring-ring is to contract about the circumference of the barrel.

The in-turned hook 14 of this ring snaps into the recess 11, and hooks against the locking wall or abutment 12 of said recess, whereby to lock the ring against rotation about the barrel.

Another member of my improved locking device comprises a continuous annular ring 16.

This ring has an interior circumference of two distinct diameters in that its lower portion 17 is of a diameter to closely fit the circumference of the barrel while its upper portion 18 is outwardly off-set so as to leave an annular space, recess or channel 19, between the exterior wall of the barrel and the interior wall of the upper ring portion 18.

The annular space, recess or channel 19 between the barrel and ring is of sufficient width to freely receive the split ring 13.

At the upper edge of the annular ring there is provided a series of ratchet teeth 20, which later are formed to fit and engage the teeth 9 on the lower edge of the portion 8.

It is therefore to be understood that the confronting edges of the handle and the annular ring are provided with coacting ratchet teeth. This feature in itself however is not novel with me but the flared and outwardly spaced annular ring with the teeth on the upper edge of the flared portion I believe to be novel.

I also provide the flared portion of the annular ring with a notch 21, which later extends downwardly from the edge having the teeth 20.

This edge notch 21 is of a size to receive the out-turned hook 15 on the end of the split ring 13, whereby the spring ring may have one end engaged with the barrel or the abutment formed therein, and its other end engaged with the rotatable ring or the abutment formed by the notch 21.

In Fig. 1 of the drawing the split ring is shown with the hook 14 engaged in the barrel recess 11 from which point said ring encircles the barrel.

The ring 16, which is shown in Fig. 1 as slipped down upon the barrel of the tool, is designed to be moved upwardly thereon to bring the parts into their proper relation, and when so moved its recessed upper portion 18 will project over and encircle the split ring,—thereby confining said split ring in the annular space or channel 19. When moving the annular ring 16 up, the notch 21 in its upper edge is brought into register with the out-turned hook 15 of the split ring so as to engage the latter with the annular ring.

This movement of the annular ring 16 will bring the ratchet-teeth 20 into engagement with the corresponding teeth 9 on the handle.

By then rotating the annular ring 16 in the direction permitted by the ratchet-teeth, or to the right as viewed in Fig. 1, the ring-notch 21, because of its engagement with out-turned hook 15 of the split ring 13, will expand the latter and place the same under greater tension, during which movement the teeth will simply ride past each other and finally engage and lock when the split ring has been expanded to the limit. The split ring having been expanded now has a greater tendency to contract and this force is directly applied to the rotatable ring 16, because the out-turned hook 15 is engaged in the notch 21 of said ring. As the annular rotatable ring 16 is engaged through the teeth 20 and 9 with the handle or cylinder head, all force set or stored up in the split ring is applied which tends to rotate the handle in one direction and the barrel in the reverse direction, and this force is therefore so exerted upon the two parts as to screw them together instead of allowing them to unscrew.

The split ring and annular rotatable ring constantly operate to tighten the handle or head and the barrel.

To prevent accidental displacement of the annular ring 16 or its separation or disengagement from the handle or head, there is provided a split spring clip 22 having inturned edge flanges 23 and 24 respectively, which clip is snapped around the tool with its flange 23 engaging the annular groove 10 in the handle, and its other flange 24 engaging a circumferential shoulder 25 on the outer side of the annular ring 16, whereby to lock the latter ring with its teeth engaging the handle-teeth.

Attention is directed to the fact that the sectional view of Fig. 3 does not pretend to be an accurate cross section through the barrel 5, in that certain longitudinal ducts and ports usually employed in the barrel construction have been omitted, because they have no bearing on the present invention.

Having described my invention, I claim:—

1. In a pneumatic tool, the combination with a barrel; a handle having threaded engagement with the barrel, said handle likewise having a series of ratchet teeth upon its lower end; a locking ring encircling the barrel and likewise having ratchet teeth upon one face, adapted to coact with the ratchet teeth upon the handle; and a split spring ring, one end engaging a recess formed in the barrel and the other engaging the locking ring aforesaid, whereby when the ring is rotated with reference to the handle it will tend to spread the spring ring and act to screw the handle upon the barrel, when the ratchet teeth on the locking ring are meshed with the ratchet teeth on the handle preventing retrograde movement of the locking ring with reference to the handle.

2. In a pneumatic tool, the combination with a barrel, of a handle having threaded engagement with the barrel, a continuous ring about the barrel and free to move in a circumferential direction about the barrel, said ring having means to engage the handle; and elastic means attached to the barrel and also connected to the ring to exert a constant rotating tendency on the ring in a direction to screw the handle and barrel together.

3. In a pneumatic tool, the combination with a barrel, of a handle having threaded engagement with the barrel and said handle being provided with ratchet-teeth; a rotatable ring encircling the barrel and having teeth to engage the teeth on the handle; and means for exerting a constant force on the rotatable ring, which force tends to turn the ring in a direction to screw the handle on the barrel.

4. In a pneumatic tool, the combination with a barrel, of a handle having threaded engagement with the barrel; a continuous ring about the barrel and free to move in a circumferential direction about the barrel, said ring having means to engage the handle; and a split spring-ring encircling the barrel with one end attached to the latter and its other end attached to the continuous ring, said spilt ring by its tendency to contract exerting a force that tends to screw the handle and barrel together.

5. In a pneumatic tool, the combination with a barrel, of a handle having threaded engagement with the barrel; a continuous ring about the barrel and having a notch therein, said ring being rotatable on the barrel but engaged with the handle; and a split spring-ring having one end attached to the barrel and its other end engaging said ring-notch, said spring ring being normally spread and tending to contract so as to exert a force on the barrel and handle that tends to screw the two together.

6. In a penumatic tool, the combination with a barrel; a handle having threaded engagement with the barrel, said handle likewise having a series of ratchet teeth upon its lower end; a locking ring encircling the barrel and likewise having ratchet teeth upon one face, adapted to coact with the ratchet teeth upon the handle; a split spring ring, one end engaging a recess formed in the barrel and the other engaging the locking ring aforesaid, whereby when the ring is rotated with reference to the handle, it will tend to spread the spring ring and act to screw the handle upon the barrel, the ratchet teeth preventing retrograde movement of the locking ring with reference to the handle; and a split spring clip having inturned flanges, said flanges engaging the handle and the locking ring respectively.

7. In a pneumatic tool, in combination, a cylinder and a cylinder head in threaded engagement; a ring movable over said cylinder into face engagement with said head; interlocking means on said ring and head, said ring having a recess; and means in said recess engaging said cylinder and said ring respectively for rotating said head relative to said cylinder to take up looseness of said parts.

In testimony whereof I have signed my name to this specification.

JOHN R. L. SANTOS.